(12) United States Patent
Toliver et al.

(10) Patent No.: US 9,321,210 B2
(45) Date of Patent: Apr. 26, 2016

(54) PLASTIC PIPE WITH BELL

(76) Inventors: Timothy Toliver, Bowling Green, OH (US); Tony Kime, Chapeau (CA); Hubert Kossner, Hassfurt (DE)

(*) Notice: Subject to any disclaimer, the term of this patent is extended or adjusted under 35 U.S.C. 154(b) by 718 days.

(21) Appl. No.: 13/378,211

(22) PCT Filed: Jun. 14, 2010

(86) PCT No.: PCT/US2010/038497
§ 371 (c)(1),
(2), (4) Date: Feb. 15, 2012

(87) PCT Pub. No.: WO2010/147887
PCT Pub. Date: Dec. 23, 2010

(65) Prior Publication Data
US 2012/0090721 A1 Apr. 19, 2012

Related U.S. Application Data

(60) Provisional application No. 61/186,871, filed on Jun. 14, 2009.

(51) Int. Cl.
| | |
|---|---|
| *F16L 9/12* | (2006.01) |
| *B29C 49/00* | (2006.01) |
| *B29C 47/12* | (2006.01) |
| *B29C 57/02* | (2006.01) |
| *B29D 23/00* | (2006.01) |
| *F16L 25/00* | (2006.01) |
| *B29C 47/00* | (2006.01) |
| *B29C 65/02* | (2006.01) |
| *B29C 65/48* | (2006.01) |

(Continued)

(52) U.S. Cl.
CPC ........... *B29C 49/0021* (2013.01); *B29C 47/126* (2013.01); *B29C 57/02* (2013.01); *B29D 23/003* (2013.01); *F16L 25/0054* (2013.01); *B29C 47/0023* (2013.01); *B29C 47/0033* (2013.01); *B29C 47/021* (2013.01); *B29C 47/065* (2013.01); *B29C 65/02* (2013.01); *B29C 65/48* (2013.01); *B29C 2791/006* (2013.01); *B29K 2023/065* (2013.01); *B29K 2023/12* (2013.01); *B29K 2027/06* (2013.01); *B29K 2105/12* (2013.01); *B29L 2016/00* (2013.01); *B29L 2023/22* (2013.01); *B29L 2031/24* (2013.01); *B29L 2031/605* (2013.01); *Y10T 29/49817* (2015.01); *Y10T 156/1028* (2015.01)

(58) Field of Classification Search
CPC ... F16L 25/0054; B29C 57/02; B29C 47/021; B29C 47/126; B29C 49/0021; B29C 65/02; B29D 23/003; B29L 2031/24
USPC .......................... 138/173, 174; 277/625–627
See application file for complete search history.

(56) References Cited

U.S. PATENT DOCUMENTS

| 2,284,741 | A | * | 6/1942 | Johnston | ........................ 249/83 |
| 2,359,755 | A | * | 10/1944 | Fischer | ............................ 249/83 |

(Continued)

*Primary Examiner* — J. Casimer Jacyna
(74) *Attorney, Agent, or Firm* — MacMillan, Sobanski & Todd, LLC (57) ABSTRACT

A multi-layer bell is formed from the outer shell of a multi-layer pipe in a secondary process, thereby allowing the extrusion process to be conducted at normal speeds. The bell may include a strain limiting membrane fused or mechanically secured between the outer shell extrusion layer and the inner liner extrusion layer, increased hoop or circumferential stiffness. This invention allows the extrusion process to be in its simplest form, with no adjustments to the corrugator or extruder speeds.

15 Claims, 5 Drawing Sheets

(51) Int. Cl.
| | |
|---|---|
| B29K 23/00 | (2006.01) |
| B29K 27/06 | (2006.01) |
| B29K 105/12 | (2006.01) |
| B29L 16/00 | (2006.01) |
| B29L 23/00 | (2006.01) |
| B29L 31/24 | (2006.01) |
| B29L 31/60 | (2006.01) |
| B29C 47/02 | (2006.01) |
| B29C 47/06 | (2006.01) |

(56) References Cited

U.S. PATENT DOCUMENTS

| | | | |
|---|---|---|---|
| 2,368,610 A * | 1/1945 | Fischer | 156/245 |
| 5,405,569 A | 4/1995 | Lupke | |
| 5,765,880 A | 6/1998 | Goddard | |
| 2002/0070551 A1* | 6/2002 | Jarvenkyla et al. | 285/374 |
| 2004/0187946 A1* | 9/2004 | Herrington | B23D 21/04 |
| | | | 138/112 |
| 2012/0153578 A1* | 6/2012 | Douglass, III | 277/627 |

* cited by examiner

PLASTIC PIPE WITH BELL

CROSS-REFERENCE TO RELATED APPLICATIONS

This application claims the benefit of U.S. Provisional Application No. 61/186,871, filed Jun. 14, 2009, the disclosure of which is incorporated herein by reference.

FIELD OF THE INVENTION

This invention relates in general to plastic pipe, and more particularly to bell designs for plastic pipe and methods of making bell designs for plastic pipe.

BACKGROUND OF THE INVENTION

Bell and spigot joints are commonly used to join pipes, including extruded plastic pipes. Bell and spigot joints typically have three components; a bell on an end of a pipe, a spigot on an end of another pipe, and a gasket. These systems typically form a water tight joint.

Typical extruded multi-wall pipe includes a corrugated layer made using an extrusion process including corrugators. Bell and spigot joints are formed during the extrusion process using pipe corrugators incorporating pipe molds and a bell blocks. For example, see U.S. Pat. No. 5,405,569. The preferred process is to apply a heated gas or fluid between the outer shell and inner liner extrusion layers to form the bell and spigot.

There are two well known methods for forming a bell on the end of an extruded multi-wall corrugated pipe during the extrusion process. The first is a single extrusion layer bell, which is formed from the outer shell extrusion layer. Single layer bell extrusion processes often include complicated corrugators and extruder controls to help thin or thicken the bell, slowing down the pipe extrusion process.

The second method for forming a bell on the end of an extruded multi-wall corrugated pipe during the extrusion process results in a bell comprised of two plastic layers formed from the outer shell and an inner liner extrusion layer being fused together. In this process, the bell is formed by evacuating the air from between the two layers during the extrusion process. This process is complicated and is also known to slow down the extrusion speed of the corrugators.

Bell design involves several issues which have caused problems in the past. Control of the bell finish diameter is significant in the performance of a bell and spigot joint. For example, the bell must have adequate strength, through reinforcement or otherwise, to maintain a cylindrical shape during transportation and usage. The bell must be able to hold its shape during spigot and gasket insertion and subsequent pressurization of the pipe assembly.

One method used in the past to add strength to a pipe bell was to use reinforcing stiffeners, such as annular ribs molded into the bell. These stiffeners add strength and help maintain roundness, but typically create undulations in the inner surface of the bell. Undulations or irregularities have been known to cause problems of gasket rolling when a bell and spigot joint are assembled, as the gasket may be caught on the reinforcing ribs.

It is well known that plastic materials can have numerous variables affecting the shrinkage rates during processing. In both of the known methods of forming an inline bell discussed above, the sealing surface of the inner bell is subject to the shrinkage variability. This can cause significant dimensional control issues. For example, rapid cooling of the bell may create internal thermal stresses which may result in deformation. Differential deformation between the bell and spigot of the pipe joint may also result in leakage of a pipe joint.

Controlling the circumferential strain in the bell is important to prevent deformation of the bell during the pipe joining process. Controlling bell strain is also important for bells subjected to internal pressure. Bell expansion caused by sustained internal hydraulic pressure, for example, may result in loss of gasket seating pressure and of a water tight seal.

In the past, hose clamps and other external devices have been used to reinforce bell and spigot joints as a field fix for problem or leaking joints. It is desirable to eliminate the need for such external sealing aids.

SUMMARY OF THE INVENTION

A multi-layer bell is formed from the outer shell of a multi-layer pipe in a secondary process, thereby allowing the extrusion process to be conducted at normal speeds. The bell is designed with increased hoop or circumferential stiffness to alleviate deformation during the installation process. This invention may be used for dual wall, triple wall, or other multiple layer pipes. The bell design may include a strain limiting membrane mechanically secured between the outer shell extrusion layer and the inner liner extrusion layer, thereby enabling the use of a wider range of high strength membrane materials that are not necessarily compatible with the base resin of the pipe. This invention allows the extrusion process to be in its simplest form, with no adjustments to the corrugator or extruder speeds in an effort to control bell wall thickness. Production speeds may be increased by allowing a thinner outer shell extrusion layer at the pipe bell. The present invention may be used in conjunction with existing pipe extruding technology, minimizing the capital investment and reducing complexity of the pipe corrugating process as compared to current multi-layer bell forming technologies performed as part of the pipe extrusion corrugating process.

Various aspects of this invention will become apparent to those skilled in the art from the following detailed description of the preferred embodiment, when read in light of the accompanying drawings.

DETAILED DESCRIPTION OF PREFERRED EMBODIMENTS

Figure 1:
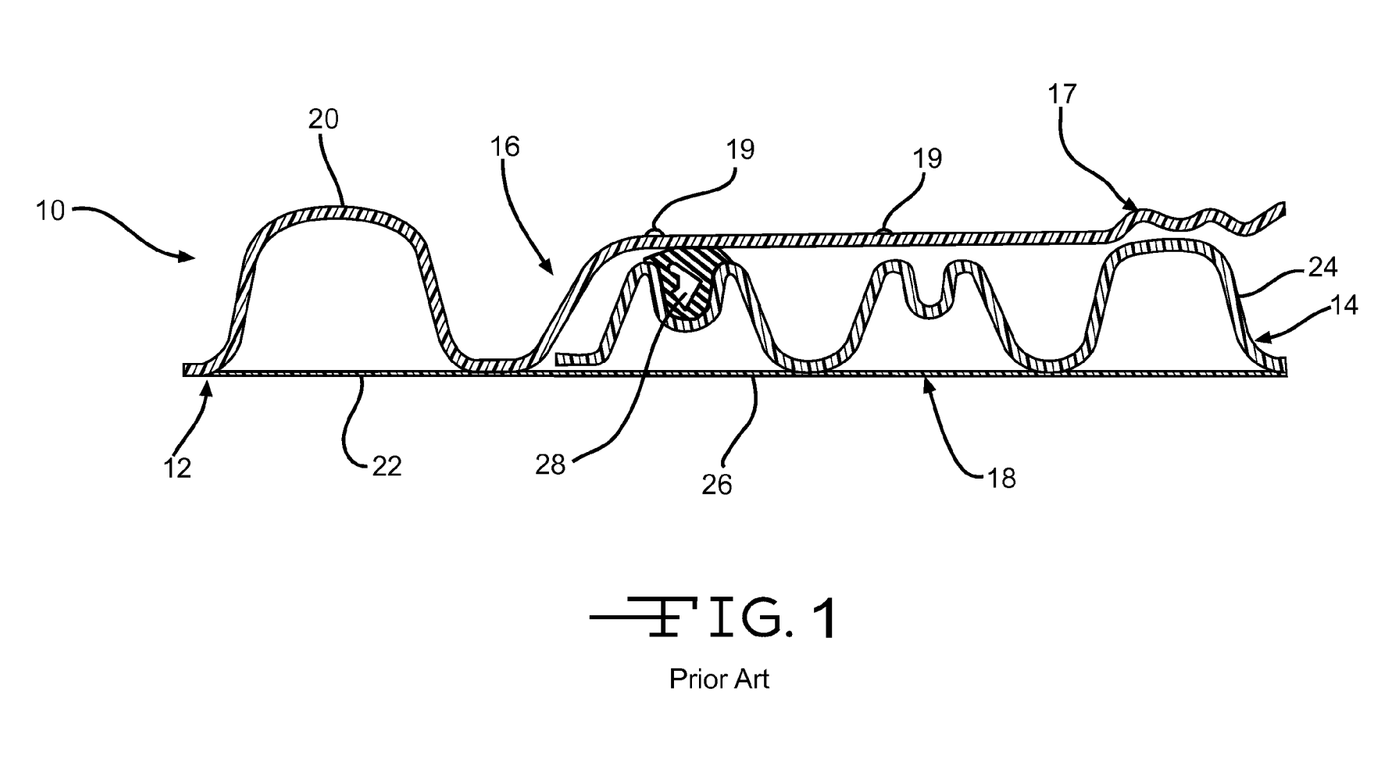
FIG. 1 is a cross-sectional view of a typical prior art watertight bell and spigot pipe joint.

FIG. 1 shows a typical multi-layer extruded plastic pipe bell and spigot joint 10. The watertight joint is formed from two pipe sections 12, 14 having a bell 16 and spigot 18, respectively. Bell pipe 12 includes an outer shell 20 and an inner liner 22. A bell 16 is formed from the outer shell extrusion layer. The bell 16 includes annular stiffening ribs 17 near the pipe end to maintain roundness. The bell 16 also includes annular stiffening ribs 19 on its outer surface which are relatively small to avoid deforming the inner surface of the bell. Spigot pipe 14 includes an outer shell 24 and an inner liner 26. A hollow polyisoprene or thermoplastic elastomer gasket 28 provides a watertight seal between the bell 16 and the spigot 18. When assembled, the inner liners 22 and 26 preferably abut to provide a smooth inner surface, but this is not essential for most applications.

Figure 2A:
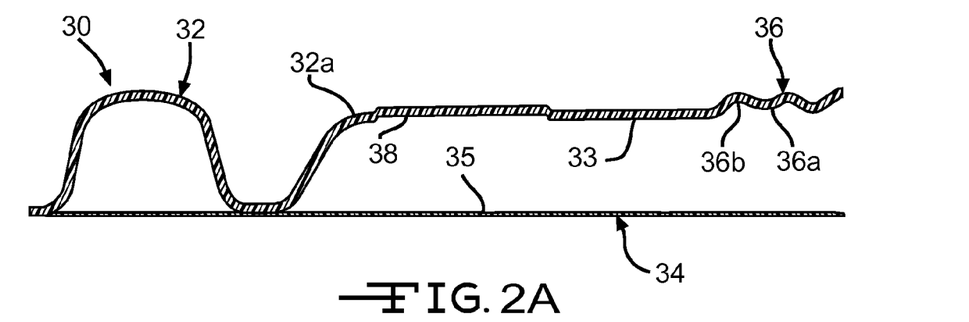
FIGS. 2A-D are cross-sectional views of a pipe bell of the present invention during various stages of the forming process.

Referring to FIG. 2A, a two-layer corrugated pipe 30 having an outer layer 32 fused to an inner liner 34 is extruded in a typical manner well known in the art. As shown in FIGS. 2A-2D, the outer layer 32 includes and bell coupler 32a having an inner surface 33 and a plurality of reinforcing ribs 36 formed therein. The reinforcing ribs 36 includes a plurality of annular ridges 36a defining an annular valley 36b between any two adjacent annular ridges 36a. The inner liner 34 has an outer surface 35. Preferably the pipe is made of high density polyethylene, but other materials may be used as well, such as polyvinyl chloride or polypropylene. A bell and spigot section is formed in the extruded pipe using a traveling mold block, again as is well known in the art. However, a traveling mold 41 of the present invention (FIG. 3) has mold blocks 41a, 41b, and 41c with cavities, described below, for forming the bell coupler 32a with reinforcing or stiffening ribs 36 adjacent the end of the bell coupler 32a, and an annular reinforcing bell membrane recess 38 inward of the reinforcing ribs 36.

A typical pipe, such as the pipe shown in FIG. 1, has a forty-eight inch inside diameter, an outer shell wall thickness of about 0.100 inches, and an inner liner 26 wall thickness of about 0.030 inches. Such a pipe may be extruded at a rate of about one foot/minute. The bell 16 length of a forty eight inch diameter pipe is about ten inches. With the present invention, there is no need to slow the extrusion process to thicken the bell 16 of the outer shell 20.

Figure 3:
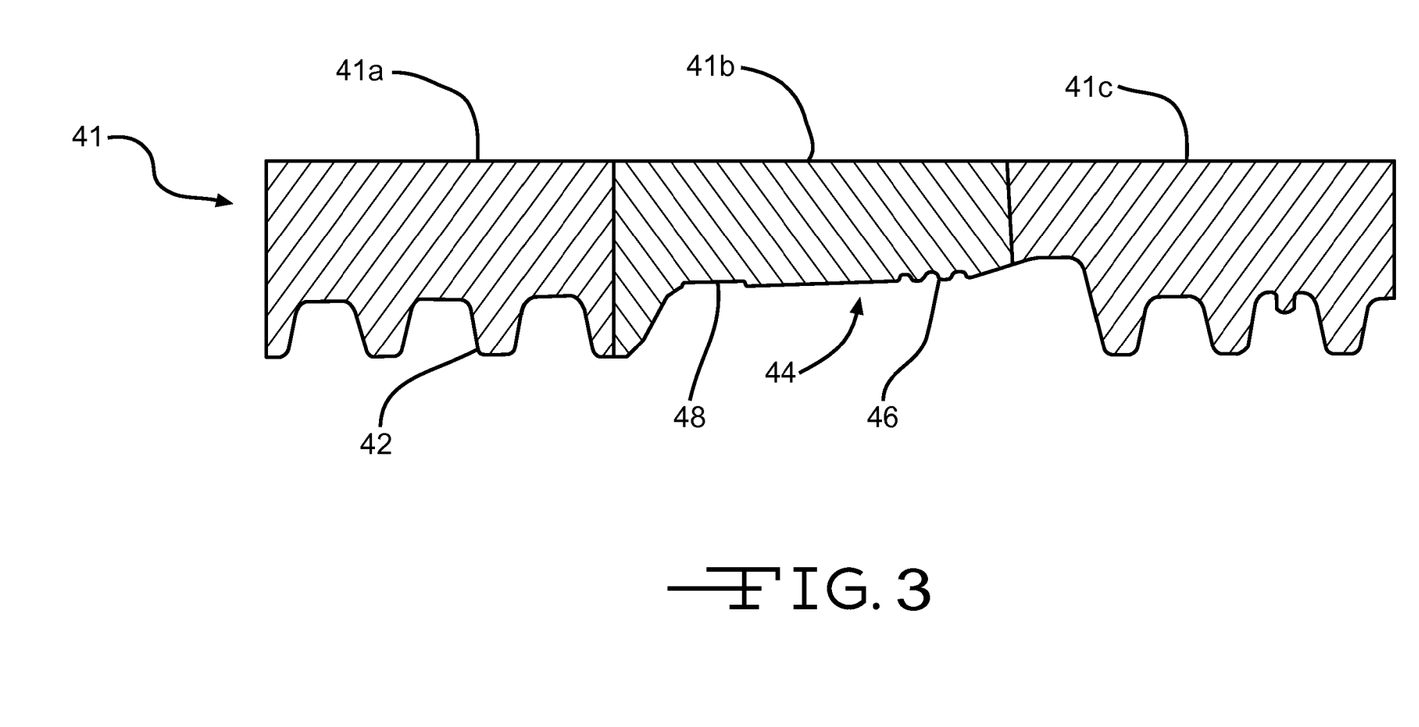
FIG. 3 is a cross-sectional view of mold blocks used to form the pipe bell of FIG. 2.

The extrusion process is conducted with the material at a temperature of 270 to 425 degrees Fahrenheit. The material must be cooled to the glass transition temperature of the base resin material of the pipe 30 so that the outer layer 32 will release from the traveling mold 41 and hold its shape. For example, a temperature of about 225 degrees Fahrenheit may allow the bell coupler 32a of the outer layer 32 to release from its mold. The exact temperature may vary depending on the base resin material of the pipe. Once the pipe 30 is cooled and removed from the traveling mold 41, a secondary bell reinforcing process, described below, takes place.

Figure 2B:
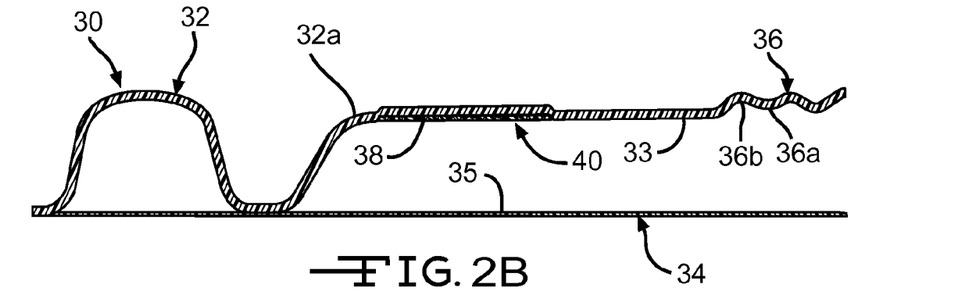

FIG. 2B shows a high tensile strain limiting annular band or reinforcing membrane 40 positioned in the bell membrane recess 38. The reinforcing membrane 40 may be inserted into the recess 38 without difficulty when the outer layer 32 is still pliable from the molding process. The reinforcing membrane 40 is preferably formed from a fiber reinforced polymer. Preferred fibers include but are not limited to nano carbon fibers, glass fibers, propylene fibers, and polyester fibers. Preferred polymers include but are not limited to high density polyethylene, polypropylene, and polyvinylchloride (PVC). The preferred fiber reinforcement is long strand glass fiber. The membrane preferably is 10% glass fiber content by weight, but can be 5% to 25% of the membrane by weight for certain applications, with the remainder being the polymer resin. The reinforcing membrane has a relatively high tensile strength, with a preferred modulus of elasticity of 1.5 to 15 times the modulus of elasticity of the base polymer used to make the pipe. The glass fiber membrane has little to no creep, which is important in maintaining the circumference and diameter of the bell and in keeping associated gasket compression for long term water tightness.

The preferred embodiment of the reinforcing membrane 40 is an extruded polypropylene. It can be extruded in eight inch wide strips (not shown) having thicknesses varying from 0.05 to 0.25 inches and cut into a preferred width for various applications. The membrane strips are also cut to proper length, with the ends fused or mechanically joined together to form the annular reinforcing membrane 40. Of course, the reinforcing membrane 40 may be formed of many other materials which are not necessarily fusible with the pipe resin. For example, a steel membrane could be used in certain applications.

The width and thickness of the membrane may vary depending on the strength needed for any particular application, but it is preferred that the membrane width is about 40% of the bell length, or 4 inches in the present example. The reinforcing membrane 40 provides a precise diameter, not subject to the shrinkage variability of the pipe bell during the extrusion process and minimizes bell strain during spigot and gasket insertion. The reinforcing membrane 40 will have significantly closer tolerances than that which can be achieved by manufacturing a single layer bell. When the reinforcing membrane 40 is compressed between the outer shell and inner layer, closer tolerances can be achieved than what is capable with currently known processes.

Figure 2C:
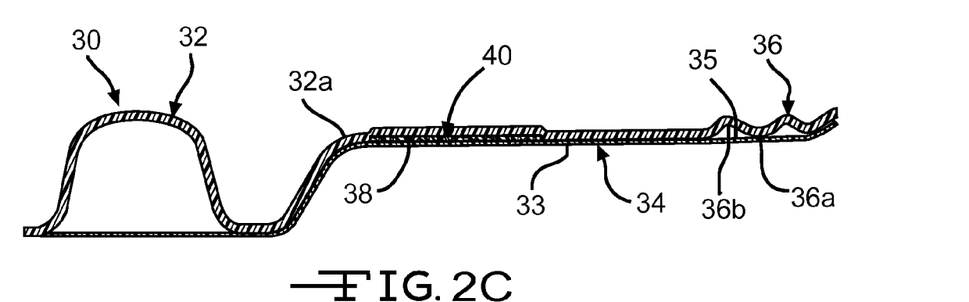

FIG. 2C shows the inner liner 34 reformed to the outer shell layer 32 in a secondary process. After the reinforcing membrane 40 is inserted, the inner liner 34 is heated and formed to the contour of the outer layer 32. The inside diameter of the reinforcing membrane 40 is generally identical to the inside diameter of the outer layer 32 adjacent to the recess 38 to provide a consistent inside diameter of the reinforcing membrane/outer layer assembly, and a smooth inside diameter of the inner liner 34 after it is formed to the outer layer 32, even under the reinforcing ribs 36.

Figure 2D:
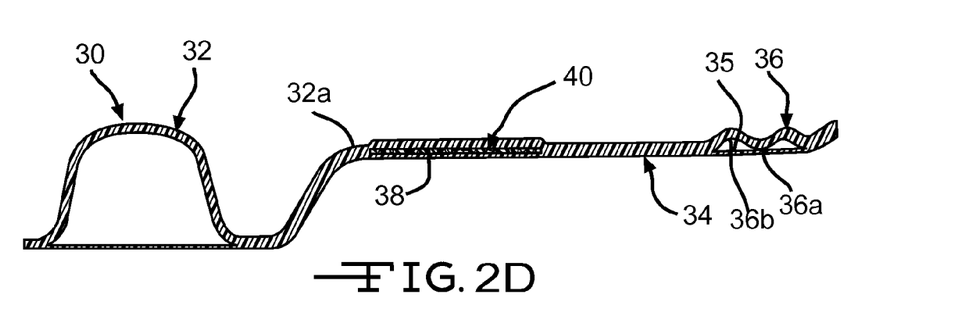

The inner liner 34 is heated until its surface reaches a temperature above the glass transition temperature and below the melt temperature of the inner liner's thermoplastic resin material. The heating process will allow the reforming of the inner liner 34 as shown in FIG. 2D. Reforming the inner liner 34 is accomplished by applying radial force to the inner liner 34 during or after the secondary heating process, forming the inner liner 34 to the outer layer 32. For example, a mechanical expander (not shown) may be used to expand the inner liner 34. Alternatively, the pipe ends can be temporarily capped as is well known in the art, and pressure or vacuum can be applied to radially force the inner liner outwardly to engage and form with the outer layer 32. In any event, reforming the inner liner 34 in close contact with the outer layer 32 traps the reinforcing membrane 40 between the two layers in the bell recess.

If the outer layer 32 is also heated until its inner surface reaches a temperature above the glass transition temperature and below the melt temperature of the outer shell's thermoplastic resin material, the reforming of the inner liner 34 to the outer layer 32 may result in a binding or fusion of the two layers. This is preferred for certain applications, but is not necessary. Alternatively, the inner layer liner 34 and outer layer 32 may be attached together by a bonding agent or adhesive, but this too is not necessary in all applications.

It is clear from FIG. 2D that the inner liner conforms to the shape of the inside surface of the outer layer/reinforcing membrane assembly, except for the region under the reinforcing ribs 36. During the step of forming the inner liner 34 to the outer layer 32, the force applied to the inner liner 34 to expand it against the outer layer 32 is not great enough under the reinforcing ribs 36 to conform the inner liner to the shape of the valleys 36b of the reinforcing ribs 36.

It is not essential that the inner liner 34 retains a perfect cylindrical shape underneath the reinforcing ribs 36. Even a small smoothing out the reinforcing ribs 36 will alleviate previously known gasket rolling problems when a bell and spigot joint are assembled. The inner liner bridging the gaps formed by the reinforcing ribs 36 will enable the gasket to pass under the bell stiffener profiles, allowing bells to be designed with additional or more pronounced reinforcing stiffeners than previously used without affecting the inner gasket sliding and sealing surface.

FIG. 3 shows the traveling mold 41 comprised of mold blocks 41 *a*, 41 *b*, and 41 *c*. Mold blocks 41 and 41 *c* include convolutions 42 for forming corrugations on the outer pipe layer. Mold block 41 *b* includes a bell shaping section 44 having annular or spiral recesses 46 for forming annular reinforcing ribs in the outer pipe layer, and an annular recess 48 for forming a reinforcing membrane recess. The continuously extruded pipe will be cut in the region generally near the abutment of mold blocks 41 *b* and 41 *c*.

Figure 4:
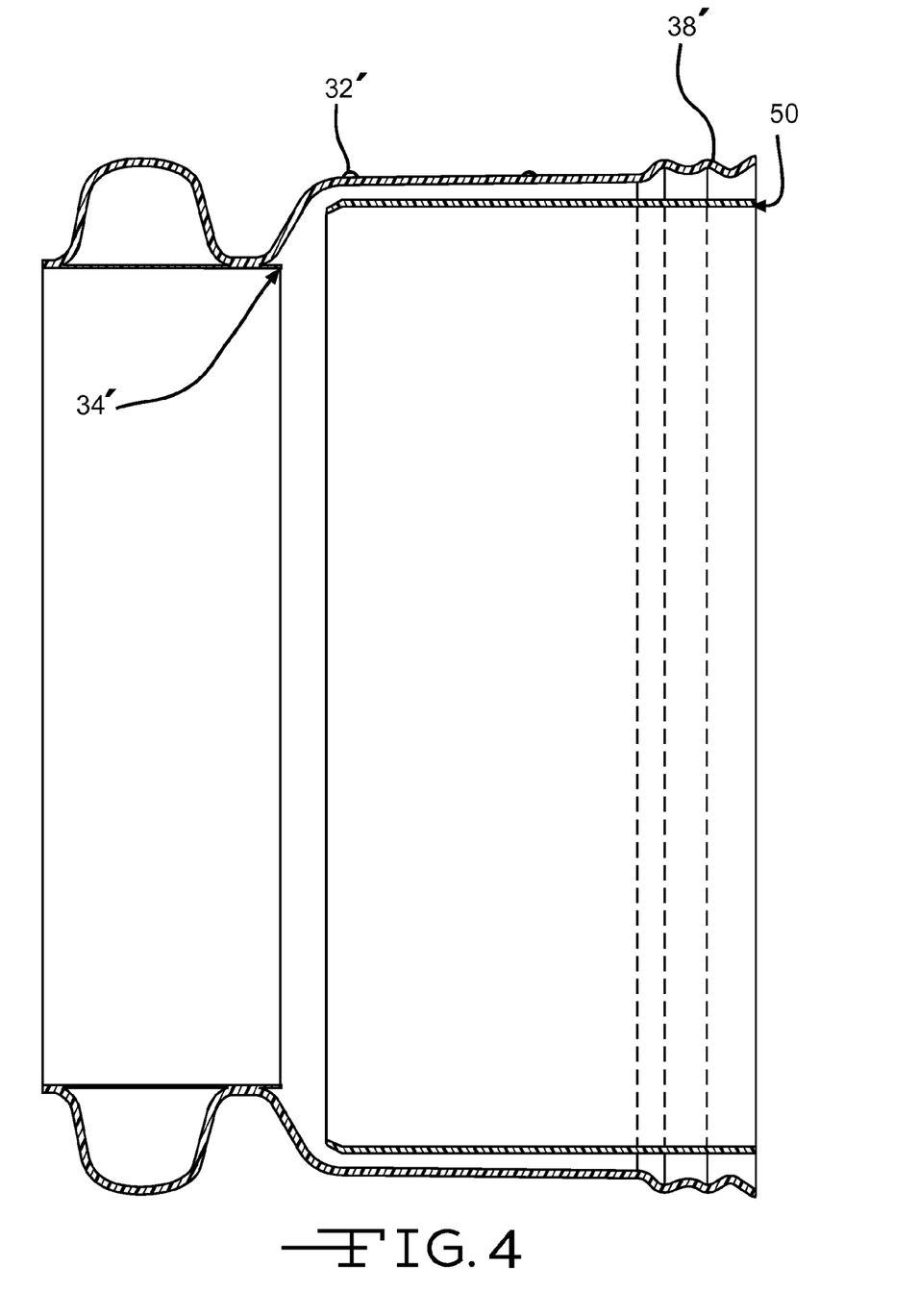
FIG. 4 is a cross-sectional view of a first alternative embodiment of the present invention.

FIG. 4 shows an alternative embodiment of the present invention. In this embodiment, the process is the same, except that the portion of the inner liner 34' adjacent the bell is trimmed or removed and replaced by a separate plastic cylinder 50 made of the same or similar material as the inner liner 34' which is bondable with the outer layer 32'. The process of heating, expanding and attaching the plastic cylinder 50 to the outer layer 32' may be accomplished in the same manner as previously described when the inner liner is used. The cylinder 50 will maintain a cylindrical shape after being joined to the outer layer 32' even below the reinforcing ribs 38' as previously described. Optionally, a reinforcing recess such as the membrane recess 38 may be formed in the cylinder 50 or the outer layer 32' and a reinforcing membrane 40 may be applied as previously described.

Figure 5A:
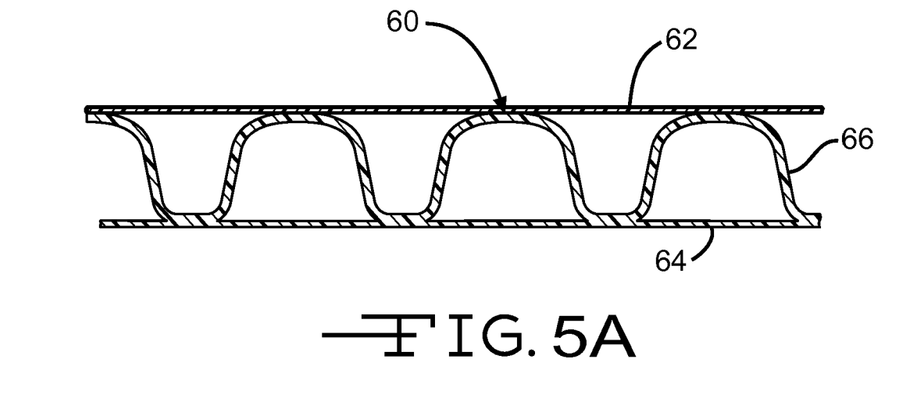
FIGS. 5A and 5B are cross-sectional views of a second alternative embodiment of the present invention.
Figure 5B:
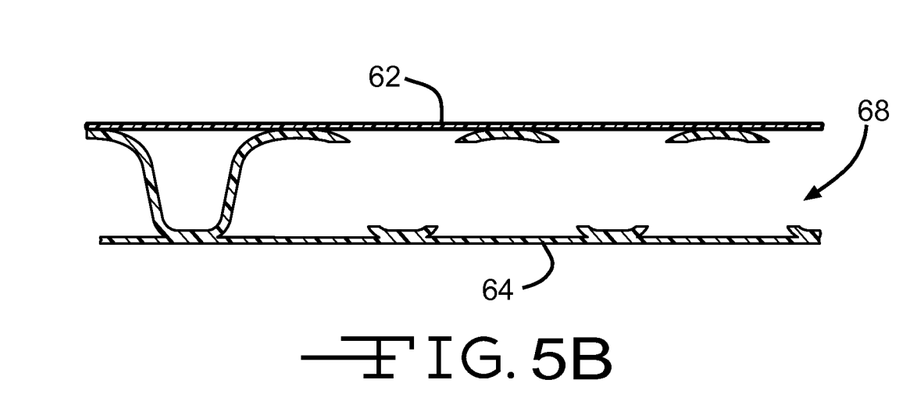

FIG. 5A shows a triple wall composite bell 60 having an outer layer 62, an inner liner 64, and an intermediate corrugated layer 66. In this alternative embodiment, after the initial extrusion process and after cooling of the pipe and removal from the mold, the intermediate layer 66 is trimmed or cut near an end of the pipe section 68 as shown in FIG. 5B. The outer layer 62 is then heated and formed in the shape of a bell, optionally with reinforcing stiffeners or ribs and a reinforcing ring recess similar to those shown in FIG. 2A. The bell may then be finally formed by expanding inner liner 64 to conform to the outer shell in the same manner as previously described, with or without a reinforcing membrane, such as the reinforcing membrane 40.

This invention is useful for pipe diameters of 4 to 120 inches, although pipes having diameters of 60 to 120 inches are typically made by extruding flat multi-layer strips which are helically or spirally wound and bonded to form what is commonly referred to as profile wall pipe. The bells for profile wall pipe are generally roll formed, and such bells are commonly called roll formed bells.

The outer layer 62 of pipe may range in thickness from 0.070 to 0.250 inches, depending on pipe diameter, with the inner liner 64 generally about 30% of the thickness of the outer shell. The reinforcing membrane of can vary in thickness from 10% of the outer layer 62 thickness to 100% of the outer layer 62 thickness and width from 10% of the bell 60 length to 100% of the bell 60 length depending on the pipe diameter and strength requirements.

The bell coupler design of this invention may be used with manufacturing methods other than those of the preferred embodiments. For example, the design may be used with injection molded bell couplers, and with non-corrugated pipe.

The principle and mode of operation of this invention have been explained and illustrated in its preferred embodiment. However, that this invention may be practiced otherwise than as specifically explained and illustrated without departing from its spirit or scope.

What is claimed is:

1. A method of forming a bell on the end of a plastic pipe, the method comprising the steps of:
   forming a heated segment of plastic pipe having an inner liner and outer layer attached to the inner liner, a portion of the outer layer having a bell shape adjacent an end of the pipe;
   allowing the heated segment of plastic pipe to cool to a temperature wherein the bell shaped outer layer portion holds its bell shape; and
   heating the cooled inner liner and forming the inner liner to the bell shaped outer layer portion such that the inner liner substantially covers an inner surface of the bell shaped outer layer portion, inner liner thereby reinforcing the bell shaped outer layer portion.

2. A method of forming a bell on the end of a plastic pipe, the method comprising the steps of:
   forming a heated segment of plastic pipe having an inner liner and outer layer;
   forming a portion of the heated outer layer to define a bell shape, wherein the portion of the heated outer layer having the bell shape is spaced apart from the inner liner, the inner liner within the bell shaped portion defining an inner bell liner;
   joining a portion of the heated inner liner to a portion of the heated outer layer at a location outside the portion of the heated outer layer having the bell shape;
   cooling the heated segment of plastic pipe to a temperature wherein the bell shaped portion of the outer layer holds its bell shape;
   subsequently re-heating the inner bell liner; and
   urging the re-heated inner bell liner into contact with an inner surface of the bell shaped portion, thereby bonding the inner bell liner with the bell shaped portion.

3. The method defined in claim 2, further including inserting a reinforcing membrane between the inner bell liner and the bell shaped portion prior to the re-heating step.

4. The method defined in claim 3, further including concurrently re-heating the bell shaped portion with the inner bell liner.

5. The method defined in claim 3, further including applying one of a bonding agent and an adhesive between the inner bell liner and the bell shaped portion prior to the re-heating step.

6. The method defined in claim 2, further including forming an annular recess on an inner surface of the bell shaped portion.

7. The method defined in claim 6, further including inserting a reinforcing membrane between the inner bell liner and the bell shaped portion and within the annular recess prior to the re-heating step.

8. The method defined in claim 2, wherein the step of urging the re-heated inner bell liner into contact with an inner surface of the bell shaped portion is performed using a vacuum to radially expand the inner bell liner.

9. The method defined in claim 2, wherein the step of urging the re-heated inner bell liner into contact with an inner surface of the bell shaped portion is performed using a mechanical expander to radially expand the inner bell liner.

10. The method defined in claim 3 wherein the reinforcing membrane is formed of a material having a modulus of elasticity at least 1.5 times as great as a base material of the segment of plastic pipe.

11. The method defined in claim 3 wherein the reinforcing membrane is formed of a material which is not fusible with a material of the inner liner and outer layer of the segment of plastic pipe.

12. The method defined in claim 2, wherein the step of cooling the heated segment of plastic pipe to a temperature wherein the bell shaped portion of the outer layer holds its bell shape includes allowing the bell shaped portion of the outer layer to cool to a glass transition temperature of a base material of the outer layer.

13. The method defined in claim 2, wherein the steps of forming a heated segment of plastic pipe, forming a portion of the heated outer layer to define a bell shape, joining a portion of the heated inner liner to a portion of the heated outer layer, and cooling the heated segment of plastic pipe define a first manufacturing process; and
    wherein the steps of subsequently re-heating the inner bell liner, and urging the re-heated inner bell liner into contact with an inner surface of the bell shaped portion define a secondary manufacturing process independent of the first manufacturing process.

14. A method of forming a bell on the end of a plastic pipe, the method comprising the steps of:
    providing a segment of plastic pipe having an inner liner and outer layer attached to the inner liner, a portion of the outer layer having a bell shape adjacent an end of the pipe;
    reinforcing the bell shaped outer layer portion with the inner liner, wherein the inner liner substantially covers the inner surface of the bell by heating the inner liner and forming the inner liner to the bell shaped outer shell portion;
    wherein the segment of plastic pipe further comprises an intermediate layer between and connected to each of the inner liner and outer layer, and wherein the method further comprises the step of removing a portion of the intermediate layer from between the inner liner and the outer layer adjacent the end of the pipe prior to reinforcing the bell shaped outer layer portion.

15. The method defined in claim 14 wherein the intermediate layer is corrugated.

* * * * *